(12) United States Patent
Miller

(10) Patent No.: US 7,299,380 B2
(45) Date of Patent: Nov. 20, 2007

(54) TESTING A RECEIVER CONNECTED TO A REFERENCE VOLTAGE SIGNAL

(75) Inventor: Joseph P. Miller, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 10/766,200

(22) Filed: Jan. 27, 2004

(65) Prior Publication Data

US 2005/0177771 A1    Aug. 11, 2005

(51) Int. Cl.
*G06F 11/00* (2006.01)
(52) U.S. Cl. .......................................... 714/25; 714/745
(58) Field of Classification Search ................. 714/25, 714/745
See application file for complete search history.

(56) References Cited

U.S. PATENT DOCUMENTS

| | | | | |
|---|---|---|---|---|
| 5,216,678 A * | 6/1993 | Nawaki | ...................... | 714/820 |
| 5,870,042 A | 2/1999 | Noda | | |
| 6,430,717 B1 * | 8/2002 | Noji | .......................... | 714/718 |
| 6,653,893 B2 * | 11/2003 | Casper et al. | .................. | 330/9 |
| 2003/0101020 A1 * | 5/2003 | Matsushige | ................. | 702/185 |
| 2004/0181730 A1 * | 9/2004 | Monfared et al. | .......... | 714/745 |
| 2004/0267482 A1 * | 12/2004 | Robertson et al. | .......... | 702/118 |
| 2004/0267483 A1 * | 12/2004 | Percer et al. | ............... | 702/118 |

OTHER PUBLICATIONS http://en.wikipedia.org/wiki/Potentiometer.*
http://en.wikipedia.org/wiki/Voltage_divider.*
Biodata Ltd 2000, "Technical Notes: Differential and Single-Ended Inputs," pp. 1-2, printed from w ebsite http://www.microlink.co.uk (Jul. 2000).
Cadence Design Systems, Inc., "Inside Differential Signals," 4 pages (2001).

* cited by examiner

*Primary Examiner*—Yolanda L Wilson

(57) ABSTRACT

A method and apparatus of testing a computer having a controller includes adjusting a reference voltage signal from a first level to a second level in response to an output from the controller. The first level is a level of the reference voltage signal during normal operation of the computer. Operation of a receiver in the computer is tested with the reference voltage signal set at the second level. An input of the receiver is connected to the reference voltage signal. Next, the reference voltage signal is adjusted back from the second level to the first level to enable normal operation of the computer.

24 Claims, 3 Drawing Sheets

TESTING A RECEIVER CONNECTED TO A REFERENCE VOLTAGE SIGNAL

BACKGROUND

A typical computer system arrangement includes a circuit board on which are mounted various components of the system, such as the central processing unit (CPU), main memory, chipset controllers, and certain peripheral devices. The components are laid out on various parts of the circuit board, with interconnecting electrical wires (that make up buses and other links) enabling communications among the components.

Two types of signals can be routed over the interconnecting electrical wires: single-ended signals and differential signals. A differential signal is the difference between two signals routed over two different wires that are connected to a differential receiver. On the other hand, a single-ended signal is routed over one wire.

In many computer systems, some single-ended signals are connected to differential receivers. In such an arrangement, one input of each differential receiver is connected to a single-ended signal, while the other input of the differential receiver is connected to a reference voltage signal.

Single-ended signal communications are usually more sensitive to noise within the computer system than differential signal communications. With differential signal communications, noise usually affects the two wires that carry the signals making up the differential signal equally. As a result, the noise effect on the two wires is cancelled out. However, because only one electrical wire is used to carry a single-ended signal, the noise cancellation effect is not available for the single-ended signal connected to one input of a differential amplifier.

A differential receiver that receives a single-ended signal is able to function properly (accurately detect the state of the single-ended signal) over a range of voltage levels of the reference voltage signal. The range of voltage levels of the reference voltage signal over which receivers connected to single-ended signals continue to work properly defines the margin of the reference voltage signal. It is desired that the margin be as large as possible to reduce likelihood of errors caused by noise or other factors during computer operation. The wider the margin of the reference voltage signal, the better the quality of a single-ended signal communications link.

Conventionally, during the design process of a given computer model, a prototype of the computer model (including a prototype circuit board) is built. Typically, a potentiometer is provided on the prototype circuit board to adjust a voltage level of a reference voltage signal for differential receivers connected to single-ended signals. The potentiometer is typically connected to a circuit that generates the reference voltage signal, with the potentiometer used to adjust the reference voltage up and down until operation of a single-ended signal communications link fails.

Although the testing of single-ended signal communications links in a prototype computer system provides some indication of the performance of single-ended signal receivers, the behavior of prototype computer systems may differ from actual production computer systems (computer systems manufactured for mass sale). One of the reasons for the different behavior is the possibility of different arrangements of components, such as CPUs, memory, and peripheral devices, in the computer systems. One computer model may have several different configurations with different arrangements and types of components.

For example, some peripheral devices are optional devices that may not be present in all configurations of the computer model. Also, CPU speeds and memory sizes and speeds may vary in different configurations. In the different configurations of the computer model, different noise levels may be present. The different noise levels present in the different configurations may affect the reference voltage margin in different ways.

Other factors may also cause the reference voltage margin to vary. Such other factors include the drive strengths of signal buffers, data or clock jitter, receiver sensitivity, and transmission line loss. Thus, the determination of the reference voltage margin in the prototype computer system may not provide an accurate indication of the reference voltage margins present in production computer systems.

SUMMARY

In general, according to one embodiment, a method of testing a computer includes adjusting a reference voltage signal from a first level to a second level in response to an output from a controller in the computer, the first level being a level of the reference voltage signal during normal operation of the computer. Operation of a receiver in the computer is tested with the reference voltage signal set at the second level. An input of the receiver is connected to the reference voltage signal.

Other or alternative features will become apparent from the following description, from the drawings, and from the claims.

DETAILED DESCRIPTION

Figure 1:
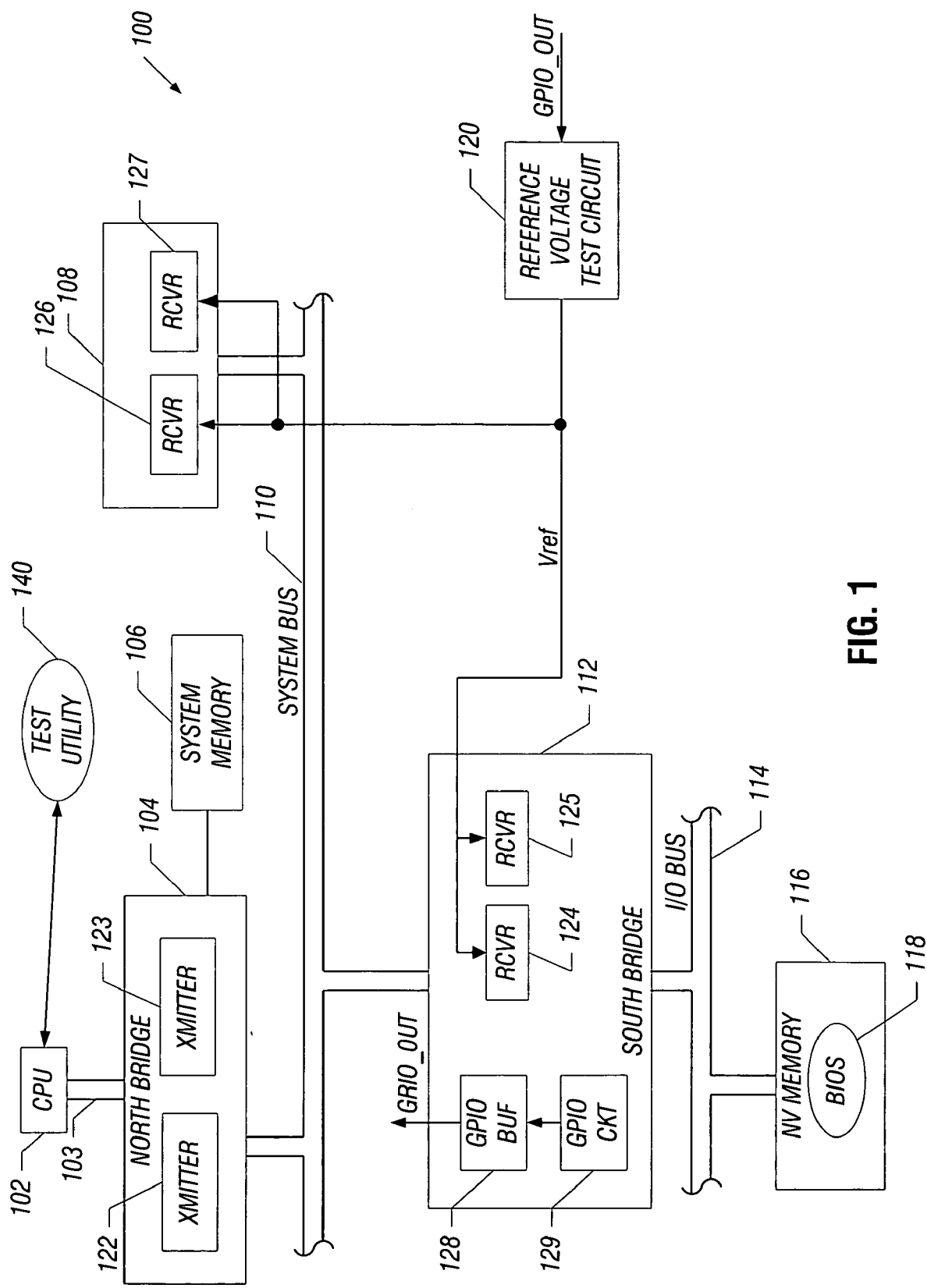
FIG. 1 is a block diagram of an example arrangement of a computer system that incorporates an embodiment of the invention.

FIG. 1 shows an example computer system 100 that incorporates test circuitry according to one embodiment of the invention. The computer system 100 includes a central processing unit (CPU) 102. Various software routines, including a test utility 140, an operating system (not shown), and other software routines, are executable on the CPU 102. In a different arrangement, the computer system 100 is a multiprocessing system having multiple CPUs.

In accordance with an embodiment of the invention, the test utility 140 performs a test sequence by causing a voltage level of a reference voltage signal to be adjusted from the "typical" voltage level of the reference voltage signal. The typical voltage level is the voltage level of the reference voltage signal during normal operation of the computer system 100. The test utility 140 causes the voltage level of the reference voltage signal to be adjusted up and/or down from the typical voltage level to perform margin testing of single-ended signal receivers (receivers that receive single-ended signals). Such receivers are differential receivers each having two inputs: a first input to receive a corresponding single-ended signal, and a second input to receive a reference voltage signal.

Once the voltage level of the reference voltage signal has been adjusted from the typical voltage level to a different voltage level, the test utility 140 performs a diagnostic test in the computer system 100. If a failure caused by the adjusted reference voltage signal is detected, then the computer system 100 is indicated as having poor reference voltage margin, and the failure is logged.

As further shown in FIG. 1, the CPU 102 is connected to a bridge 104 (referred to as a "north bridge") over a processor bus 103. The north bridge 104 is connected to system memory 106 and a system bus 110. Other components are also connected to the system bus 110, including a network interface controller (NIC) 108 and another bridge (referred to as a "south bridge") 112. The system bus 110 includes a number of electrical wires (or transmission lines) for routing signals between the components connected to the system bus 110.

The south bridge 112 is further connected to an input/output (I/O) bus 114, which is connected to a non-volatile memory 116. Basic input/output system (BIOS) software 118 is stored in the non-volatile memory 116. The BIOS software 118 is executed by the CPU 102 during a system power-on sequence.

The arrangement depicted in FIG. 1 is provided for purposes of example only. In other embodiments, other arrangements of a computer system can be employed.

To communicate over the system bus 110, each of the components connected to the system bus 110 includes transmitters and receivers. A transmitter is basically an output buffer that drives a signal onto an electrical wire of the system bus 110. A receiver receives a signal routed over the electrical wire to produce an internal signal that represents the signal routed over the wire. The system bus 110 has multiple signals, including control signals, data signals, address signals, and so forth. To drive these signals, the components on the system bus 110 include multiple transmitters and receivers.

Components coupled to the other buses in the computer systems 100, such as the processor bus 103 and the I/O bus 114, similarly include transmitters and receivers for communicating signals over respective buses.

In accordance with some embodiments of the invention, the computer system 100 includes a reference voltage test circuit 120 for generating a reference voltage signal (Vref). The reference voltage signal Vref is used as the reference voltage signal by receivers in components connected to single-ended signals, such as the signals making up the system bus 110. The system bus 110 is an example of a multi-drop bus. In other embodiments, the reference voltage test feature described herein can be applied to signals of point-to-point connections.

Examples of receivers that receive single-ended signals include receivers 124 and 125 in the south bridge 112 and receivers 126 and 127 in the network interface controller 108. Transmitters are also coupled to the system bus 110 to transmit signals over the system bus 110. Examples of transmitters include transmitters 122 and 123 in the north bridge 104. Note that the south bridge 112 and network interface controller 108 also include transmitters to transmit signals over the system bus 110, and the north bridge 104 also includes receivers to receive signals from the system bus 110.

During normal system operation, the reference voltage signal Vref is set at its typical voltage level. However, in accordance with some embodiments of the invention, the test utility 140 is configured to adjust the level of the reference voltage signal Vref to determine whether an operating margin for the reference voltage signal is acceptable. The test utility 140 causes a change in the voltage level of the reference voltage signal Vref from the typical voltage level to a different test voltage level, and performs a diagnostic test of the computer system 100 with the reference voltage signal Vref set at the test voltage level. The test voltage level in Vref is set based on the desired margin for the reference voltage signal Vref. In one example implementation, the change in the voltage level of the reference voltage signal Vref from its typical voltage level can be ±5%. Alternatively, larger or smaller percentage changes from the typical reference voltage level (e.g., ±10%, ±15%, ±3%, etc.) can also be used.

According to some embodiments of the invention, performing the diagnostic test with the reference voltage signal Vref set at a voltage higher and/or lower than the typical reference voltage allows the computer system manufacturer to determine if there is sufficient margin for the reference voltage signal Vref. If errors are detected in the diagnostic test with Vref set at the elevated or reduced voltage level, then insufficient margin exists for the computer system 100. This testing can be performed at the manufacturing stage or at the assembly stage to identify computer systems that are defective. A system that fails the diagnostic test is marked as defective, and can either be discarded or sent to a repair facility to determine whether the computer system 100 can be repaired.

The voltage level of Vref as generated by the reference voltage test circuit 120 is controlled by an output of a buffer 128 in the south bridge 112. In one example implementation, the buffer 128 is a general purpose input/output (GPIO) buffer that is part of a GPIO port of the south bridge 112. The GPIO buffer 128 produces an output GPIO_OUT that is provided to the reference voltage test circuit 120.

GPIO circuitry in the south bridge 112 can be assigned to various configurable functions as desired by a system manufacturer. The GPIO buffer 128 is controlled by a GPIO circuit 129 in the south bridge 112. The GPIO circuit 129 may include configuration registers (or command registers) that are accessible by the test utility 140 executing on the CPU 102. To vary the voltage level of Vref, the test utility 140 sends commands to the GPIO circuit 129 to control the state of GPIO_OUT.

The GPIO_OUT can be driven to a high state or a low state in response to input from the GPIO circuit 129. A low state of GPIO_OUT causes the reference voltage test circuit 120 to drive Vref to one voltage level lower than the typical Vref level, while a high state of GPIO_OUT causes the reference voltage test circuit 120 to drive Vref to another voltage level higher than the typical Vref level. In addition, if GPIO_OUT is tristated, Vref is set at its typical voltage level.

Figure 2:
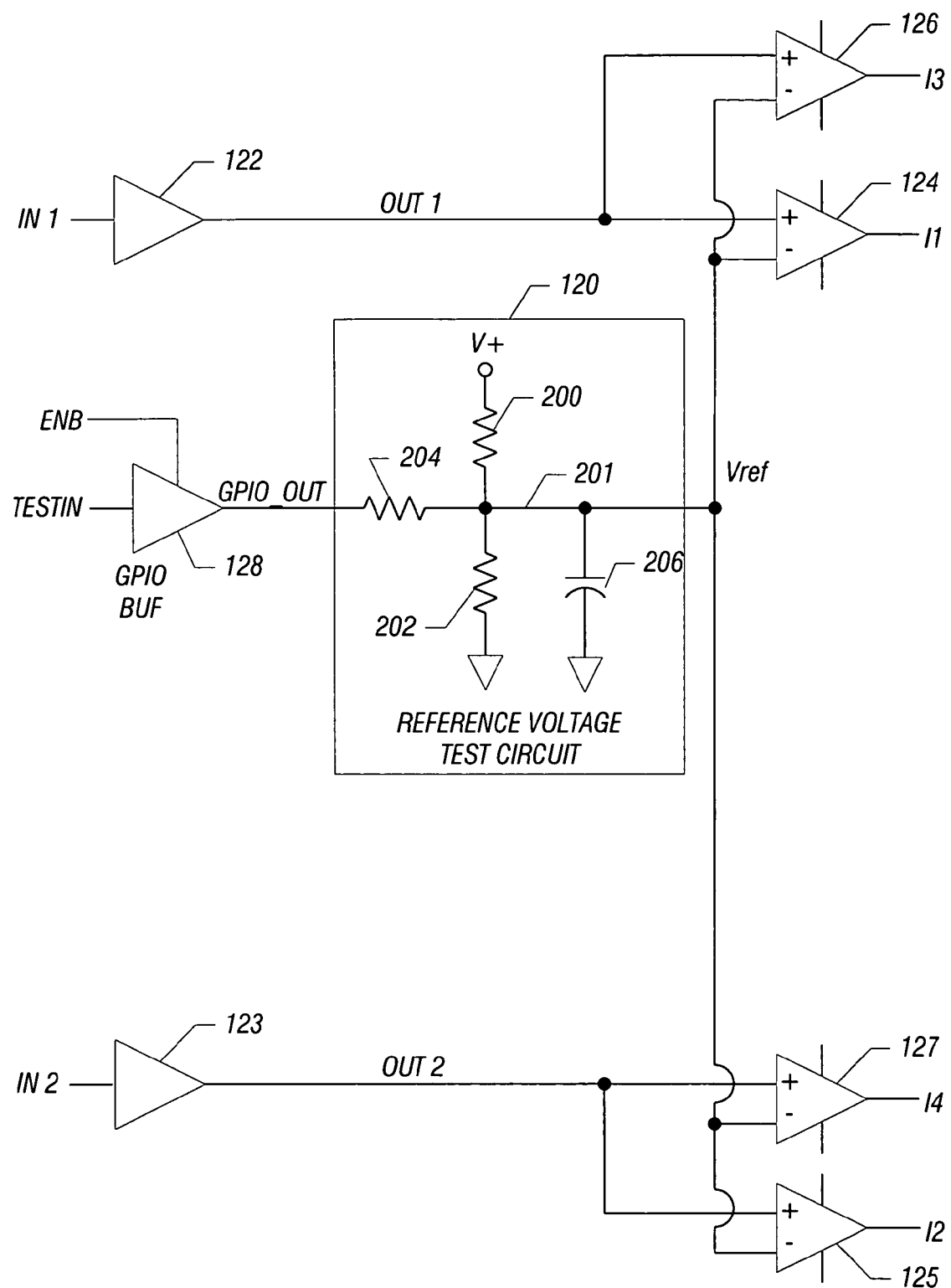
FIG. 2 is a schematic diagram of test circuitry according to an embodiment.

FIG. 2 is a schematic diagram of the reference voltage test circuit 120, transmitters 122 and 123, and receivers 124, 125, 126, and 127. The reference voltage test circuit 120 includes a resistor divider pair that includes a resistor 200 and a resistor 202. The reference voltage signal Vref is produced by a node 201 between the resistors 200 and 202. The level of the reference voltage signal Vref is based on the ratio of the resistance values of the resistors 200 and 202. The resistor 200 is connected between a positive (or more positive) voltage (V+) and node 201, while the resistor 202 is connected between a ground (or more negative) voltage and node 201.

Another resistor 204 is also provided in the reference voltage test circuit 120. The resistor 204 is connected between the GPIO_OUT output of the buffer 128 and the node 201 between the resistor pair (200, 202). In response to commands from the test utility 140, the GPIO circuit 129

(FIG. 1) controls the value of the data input (TESTIN) and the enable input (ENB) to the GPIO buffer 128. If the enable input (ENB) is inactive, then the output of the GPIO buffer is tristated. If the enable input ENB is active, then the GPIO buffer 128 drives its output to the level indicated by TESTIN.

If the GPIO buffer 128 is inactive (its output is tristated), then the reference voltage signal Vref is at its typical voltage level (as set by the resistors 200 and 202). However, if the GPIO buffer 128 is active, then the voltage level of Vref is adjusted based on the output voltage of the GPIO buffer 128. If the output of the GPIO buffer 128 is at a high level, then Vref is adjusted upwardly based on the ratio of the resistance values of the resistors 200, 202, and 204. However, if the GPIO buffer 128 drives its output low, then Vref is driven downwardly to a reduced voltage (less than the typical reference voltage level). Additional GPIO buffers 128 (and associated resistors) may be coupled to the Vref node 201 to further provide other possible voltage levels of Vref.

In other embodiments, the GPIO buffer and associated GPIO circuitry of other components (other than the south bridge 112) can be used to adjust the level of Vref. Alternatively, instead of using a GPIO buffer, other types of buffers can be employed to adjust the level of Vref.

Additionally, in other embodiments, instead of the arrangement of the reference voltage test circuit 120 depicted in FIG. 2, an electronically adjustable potentiometer can be used instead to vary the voltage level of Vref in response to commands from the test utility 140. In yet another embodiment, an adjustable digital-to-analog (D/A) converter can be used to set different voltage levels of Vref in response to commands from the test utility 140 for purposes of diagnostic testing.

The reference voltage test circuit 120 depicted in FIG. 2 also includes a capacitor 206 that is designed to remove high frequency noise from the reference voltage signal Vref. The reference voltage signal Vref is connected to a minus (−) input of each of receivers 124, 125, 126, and 127. In other arrangements, more than one reference voltage test circuit can be provided to provide multiple reference voltage signals.

The plus (+) input of receivers 124 and 126 are connected to an output signal (OUT1), which is outputted by the transmitter 122 based on the value of input signal IN1 (which is generated within the north bridge 104 depicted in FIG. 1). The + inputs of receivers 125 and 127 are connected to signal OUT2, which is generated by the transmitter 123 based on the state of input signal IN2. The receivers 124, 125, 126, and 127 generate respective signals I1, I2, I3, and I4, respectively, in the south bridge 112 and the network interface controller 108.

Each receiver 124, 125, 126, or 127 is a differential receiver that compares the input single-ended signal at its + input with the reference voltage signal at the − input to produce the output signal I1, I2, I3, or I4. If Vref is too high or too low, then the receiver 124, 125, 126, or 127 may not accurately detect the state of the input single-ended signal at its + input.

Various factors in a computer system may cause the reference voltage signal Vref to shift upwardly or downwardly. Such factors include noise, changes in temperature, aging of a power supply of the computer system, transmitter drive strengths, data or clock jitter, sensitivity of receivers, loss over a transmission line, and other factors. Once the reference voltage signal Vref shifts due to one or more of such factors, then the upward or downward adjustment of Vref by the reference voltage test circuit may cause failure of one or more single-ended signal receivers. Such failure is detected during the diagnostic test performed by the test utility 140.

Note that Vref may shift by differing amounts in different systems due to one or more of the factors identified above. Due to such different behaviors of Vref in different computer systems, a reference voltage diagnostic test is performed in each computer system by a respective test utility 140 to determine whether poor Vref margin exists for such a computer system.

Figure 3:
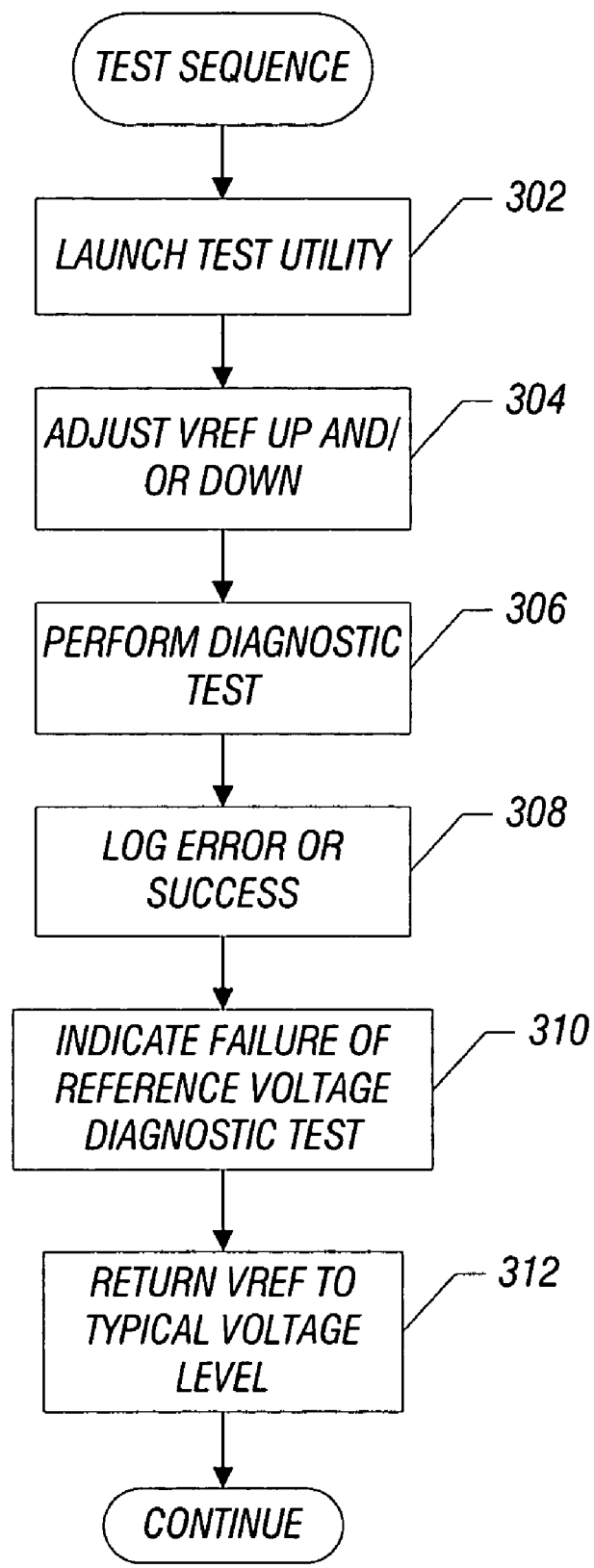
FIG. 3 is a flow diagram of a test sequence according to one embodiment.

FIG. 3 shows a test sequence performed by the test utility 140, in accordance with one embodiment. The computer system 100 first launches (at 302) the test utility 140. The test utility 140 may present a graphical user interface for interaction with a user. Alternatively, the test utility 140 may communicate over a network with a remote operator for purposes of performing the test. In yet another embodiment, the test utility 140 may be part of other diagnostic software launched and run to test the computer system 100 during the manufacturing or assembly process.

The test utility 140 adjusts the voltage level of Vref up and/or down (at 304) by a predetermined amount. For example, Vref may be adjusted upwardly by 5%, 10%, and so forth. Similarly, Vref may be adjusted downwardly by 5%, 10%, and so forth. The adjustment by specified percentage is accomplished by selecting corresponding values of the resistors in the reference voltage test circuit 120. The percentage adjustments are also based on voltage rails and margin requirements of the system.

After Vref has been adjusted up or down, the test utility 140 performs a diagnostic test (at 306). The diagnostic test involves operations in which signaling is communicated between various components, including the north bridge 104, network interface controller 108, and south bridge 112. For example, the diagnostic test can cause traffic to be generated on the system bus 110 such that the transmitters 122 and 123 output signals over the system bus 110 for receipt by the receivers 124, 125, 126, and 127.

Errors detected by the test utility 140 during the diagnostic testing are logged by the test utility 140. The error information can be stored locally in the computer system 100 for later retrieval by an operator, or the test utility 140 can communicate the error information to a remote site for analysis by an operator. Also, the test utility 140 may set (at 310) some type of an indicator in a log file or other like data structure to indicate that the computer system 100 has failed the reference voltage diagnostic test. If further testing with other Vref values is desired, the acts of 304-310 can be repeated. After testing is completed, Vref is set back to its typical voltage level (at 312).

Instructions of the various software routines or modules discussed herein (such as the test utility 140 and other software components) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of testing a computer, the computer having a controller, the method comprising:
   during a test sequence, adjusting a reference voltage signal from a first level to a second level in response to an output from the controller in the computer, the first level being a level of the reference voltage signal during normal operation of the computer;
   during the test sequence, testing operation of a receiver in the computer with the reference voltage signal set at the second level, an input of the receiver being connected to the reference voltage signal, and another input of the receiver being connected to a single-ended signal that is processed by the receiver both during the normal operation and the test sequence; and
   adjusting the reference voltage signal back from the second level to the first level to enable normal operation of the computer.

2. The method of claim 1, wherein testing the operation of the receiver comprises testing operation of a differential receiver.

3. The method of claim 1, further comprising testing operation of a second receiver, the second receiver being connected to the reference voltage signal.

4. The method of claim 3, wherein the computer comprises a bus having transmission lines for carrying plural signals, the method further comprising transmitting the plural signals over the transmission lines to the receivers.

5. The method of claim 4, wherein transmitting the plural signals is performed by transmitters in a bus device connected to the bus.

6. The method of claim 1, further comprising controlling the output of the controller by a software routine.

7. The method of claim 6, wherein controlling the output of the controller comprises controlling a general purpose input/output (GPIO) port of the controller.

8. The method of claim 1, further comprising indicating a margin of the reference voltage signal as poor in response to the testing producing an error.

9. The method of claim 1, wherein adjusting the reference voltage signal comprises a test circuit adjusting the reference voltage signal, the test circuit responsive to the output of the controller.

10. A computer system comprising:
    a processor;
    a computer-readable storage medium to store test software, the test software executable on the processor;
    a circuit to generate a reference voltage signal;
    a receiver having a first input connected to the reference voltage signal and a second input connected to a single-ended signal that is processed by the receiver during normal operation of the computer system; and
    the circuit responsive to the test software to adjust a voltage level of the reference voltage signal from a first voltage level to a second voltage level,
    the test software to perform a diagnostic test with the reference voltage signal at the second voltage level to test operation of the receiver to perform margin testing of the receiver with respect to the single-ended signal.

11. The computer system of claim 10, further comprising a second receiver having an input connected to the reference voltage signal, the diagnostic test to also test operation of the second receiver.

12. The computer system of claim 11, wherein the receivers are differential receivers each having a second input connected to a respective single-ended signal.

13. The computer system of claim 12, further comprising a bus, wherein the bus comprises transmission lines to carry the single-ended signals.

14. The computer system of claim 10, further comprising: a transmitter to generate the single-ended signal.

15. The computer system of claim 10, further comprising a general purpose input/output (GPIO) buffer responsive to commands from the test software to control the voltage level of the reference voltage signal produced by the circuit.

16. The computer system of claim 10, wherein the circuit comprises a voltage divider to produce the reference voltage signal, the circuit further comprising a resistor connected to the voltage divider to adjust the voltage level of the reference voltage signal from the first voltage level to the second voltage level.

17. The computer system of claim 10, wherein the circuit comprises an electronically adjustable potentiometer responsive to the test software.

18. The computer system of claim 10, wherein the circuit comprises a digital-to-analog converter responsive to the test software.

19. A computer system comprising:
    a processor;
    a computer-readable storage medium to store software, the software executable on the processor;
    means for generating a reference voltage signal; and
    receiving means having a first input connected to the reference voltage signal and a second input connected to a single-ended signal that is processed during normal operation of the computer system;
    wherein the generating means is responsive to the software to adjust a voltage level of the reference voltage signal from a first voltage level to a second voltage level, and
    the software to perform a diagnostic test with the reference voltage signal at the second voltage level to rest operation of the receiving means to perform margin testing of the receiving means with respect to the single-ended signal.

20. An apparatus for use in a computer, comprising:
- a transmitter to transmit a single-ended signal for use during normal operation of the computer;
- a circuit to generate a reference voltage signal;
- a receiver having a first input connected to the single-ended signal, and a second input connected to the reference voltage signal; and
- a controller to control the circuit to vary a voltage level of the reference voltage signal during a test sequence,
- wherein the controller is adapted to perform a diagnostic test during the test sequence after varying the voltage level of the reference voltage signal to test performance of the receiver with respect to the single-ended signal.

21. The apparatus of claim 20, wherein the controller is adapted to control the circuit to vary the voltage level of the reference voltage signal from a first voltage level to a second voltage level, the first voltage level corresponding to a voltage level of the reference voltage signal for normal operation,
- the controller adapted to perform the diagnostic test with the reference voltage signal set at the second voltage level.

22. The apparatus of claim 20, wherein the receiver comprises a differential receiver.

23. The apparatus of claim 20, wherein the controller comprises software.

24. An article comprising at least one computer-readable storage medium containing instructions that when executed cause a computer to:
- send commands during a test sequence to a circuit to cause a voltage level of a reference voltage signal to be adjusted from a first level to a second level, the first level corresponding to a voltage level of the reference voltage signal during normal operation; and
- perform, during the test sequence, a diagnostic test of a receiver having a first input connected to the reference voltage signal with the reference voltage signal at the second level, and the receiver having a second input connected to a single-ended signal that is processed both during the normal operation and the test sequence.

* * * * *

UNITED STATES PATENT AND TRADEMARK OFFICE
CERTIFICATE OF CORRECTION

| | |
|---|---|
| PATENT NO. | : 7,299,380 B2 |
| APPLICATION NO. | : 10/766200 |
| DATED | : November 20, 2007 |
| INVENTOR(S) | : Joseph P. Miller |

It is certified that error appears in the above-identified patent and that said Letters Patent is hereby corrected as shown below:

Column 5, lines 49-50, delete "11, 12, 13, and 14," and insert -- I1, I2, I3, and I4, --, therefor.

Column 8, line 64, in Claim 19, delete "rest" and insert -- test --, therefor.

Signed and Sealed this

Eighth Day of April, 2008

JON W. DUDAS
*Director of the United States Patent and Trademark Office*